Aug. 5, 1958  R. BAILEY ET AL  2,846,141
ANALOGUE COMPUTING APPARATUS
Filed Aug. 24, 1953  2 Sheets-Sheet 1
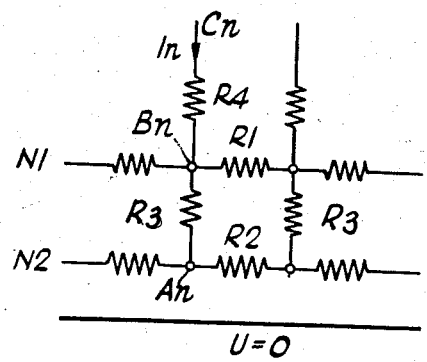
FIG.1.
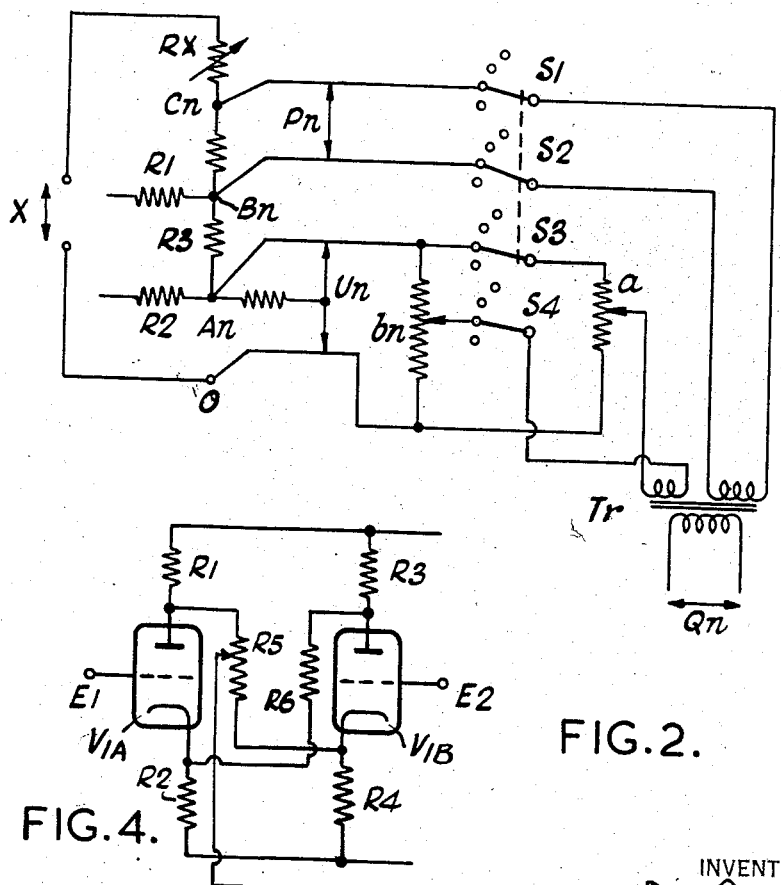
FIG.2.
FIG.4.
INVENTORS
Ray Bailey
Gerhard Liebmann
By 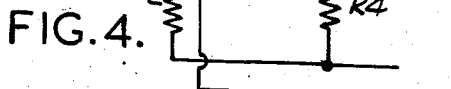
ATTORNEYS United States Patent Office 2,846,141
Patented Aug. 5, 1958

2,846,141

ANALOGUE COMPUTING APPARATUS

Roy Bailey, Woolhampton, and Gerhard Liebmann, Aldermaston, England, assignors to Sunvic Controls Limited, London, England, a British company Application August 24, 1953, Serial No. 376,166

Claims priority, application Great Britain August 28, 1952

5 Claims. (Cl. 235—61)

This invention relates to computing apparatus for solving physical problems by electrical circuit analogues.

The invention has an important application in displaying the residual voltages obtained in solving physical problems by iteration methods using resistance network analogues.

In such methods, a resistance network representing the problem is constructed, currents are fed into the network at appropriate junction points and the voltage distribution produced in the network is measured. The currents are then readjusted and the voltages re-measured, and this process is repeated until a distribution of voltages and currents is obtained which everywhere satisfies certain mathematical relations derived from the original differential equation required to be solved.

An example of such a method is described in British Patent No. 684,989, and the method is applicable, for example, to determining the electric and magnetic field distributions in waveguides and cavity resonators or the vibrations of elastic membranes or of "whirling shafts."

The main object of the present invention is to provide improved apparatus for assisting the iteration process.

According to the present invention, computing apparatus comprises an analogue electrical resistance network representing the physical problem to be solved, means for feeding currents of known value at a number of nodal junction points in the network and means for measuring the resulting potentials, together with means for deriving a desired expression for said current and potential values and comparing the value of said expression with an optimum value so as to derive an error signal from the nodal junction point in question, and means for simultaneously displaying the error signals derived from a number of nodal junction points so as to determine the effect of current adjustments on the individual nodal junction point errors.

Preferably the errors are applied in a recurring sequence to a cathode ray tube having sufficient afterglow to maintain a continuous presentation, the traces for the individual nodal junction points being separated on the screen for purposes of comparison.

It will be appreciated that by arranging the mathematical relations to be satisfied in such a way that their non-fulfilment in the network analogue will result in an error signal, directly related in sign and magnitude to the degree of deviation of the actual condition present from the condition required for the solution of the problem, and by displaying simultaneously the error signals for a plurality of the network nodes, the degree of fulfilment of the required conditions can be observed, and, if need be, improved at a plurality of measuring positions, and preferably simultaneously at all appropriate measuring positions.

In order that the invention may be more clearly understood, reference will now be made to the drawings herewith.

Fig. 1 shows a section of an analogue resistance network to which the invention is applied;

Fig. 2 illustrates a method of deriving an error signal;

Fig. 4 is a detail showing a circuit suitable for the difference units in Fig. 3.

Figure 3:
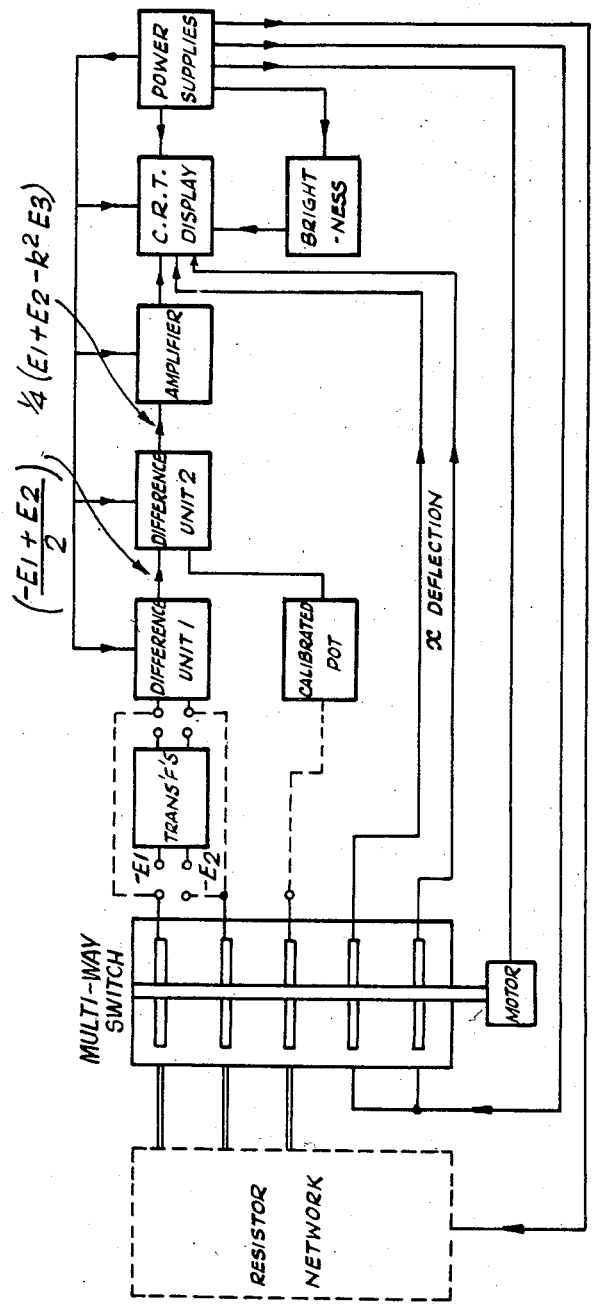
Fig. 3 is a block schematic diagram of the apparatus.

The invention will be further explained, by way of illustration, with reference to a resistor network arrangement used in the solution of the fourth order differential equation describing the "critical" speeds of a "whirling shaft":

$$\frac{d^2}{dx^2}\left(EI\frac{d^2y}{dx^2}\right)=m\omega^2 y \tag{1}$$

where $x$ is the position along the shaft, $y$ the shaft deflection, E is Young's modulus, I the moment of inertia about the axis, $m$ the weight of the shaft per unit length, and $\omega$ the "critical" speed. A section of the network is shown in Fig. 1. This network comprises two resistance strips $N_1$ and $N_2$, made up of chains of resistances $R_1$ and $R_2$ respectively, the two resistance strips being interconnected by a series of resistances $R_3$. The values of the resistances $R_1$, $R_2$, and $R_3$ are determined by the local values of (EI) and $m$, and appropriate scaling factors. The corresponding points $A_n$ and $B_n$ in the resistance chains $N_1$ and $N_2$ correspond to the $n$th point measured along the shaft. The shaft deflection $y$ at this $n$th point is represented by the voltage $U_n$ at point $A_n$, measured with reference to the zero point of voltage, common to the networks and a voltage source (not shown in Fig. 1). Then the current $I_n$ fed into point $B_n$ in network $N_1$ should have this value when the solution of Equation 1 is reached:

$$I_n=[\alpha m\Delta x'\Delta x''\omega^2-\beta_n]U_n/R_1 \tag{2}$$

where $\alpha$ is a known scaling constant, $\Delta x'$ and $\Delta x''$ are the intervals to the left and right of points $A_n$ (and $B_n$) and $\beta_n$ is a constant determined by the bearing reaction at points $A_n$. If now the current $I_n$ is measured as a voltage drop $P_n$ across a resistance of value $R_4$, this resistance being arranged between the network point $B_n$ and the feeding point $C_n$, Equation 2 can be put into the form:

$$P_n-(a_0-b_n)U_n=0 \tag{3}$$

The $U_n$'s and $P_n$'s are measured voltages, $b_n$'s are known positive or negative constants, and "$a_0$" is the value of a constant determined by the solution. "$a_0$" is identical with $\omega^2$, the square of the sought "critical" speed, apart from (known) scaling factors. However, while Equation 3 represents the final condition to be satisfied when the solution of the problem is complete, at the beginning and during the progress of the iteration process the actual condition existing in the network is at points $A_n$ and $B_n$ given by $$P_n-(a-b_n)U_n=Q_n \tag{4}$$

where $a \neq a_0$, and $Q_n \neq 0$. The term $Q_n$ represents the aforementioned "error signal" or "residual," and it is known that the condition $Q_n=0$ for all values of $n$ can only be reached together with the condition $a=a_0$. While it has been shown that a solution can be achieved by a systematic iteration procedure such that $Q_n \to 0$ and $a \to a_0$, this proves often slow and tedious. By displaying in a suitable way simultaneously all (or a substantial part of all) residuals $Q_n$ according to their sign and magnitude, it is not only possible always to pick out the largest value of $Q_n$ and reduce this, but also to observe how far the reduction of a certain value of $Q_n$ may be taken in each case without increasing unduly other residuals. In this way, the advantages of the automatic features of the current distribution in resistance networks and of the mathematical "relaxation" process are secured simultaneously with a great saving in time and effort.

A simple circuit arrangement, by which the relation Equation 4 can be established, is shown as illustration of this principle in Fig. 2. The section of the network is the same as shown in Fig. 1. The currents $I_n$ are fed from an A. C. potential source X, with "zero potential point" 0, and are adjusted by rheostats $R_x$. The point $A_n$ is connected to the $n$th stud of multiple switch $S_3$, the common pole of which connects to potentiometer "$a$," so that the potential "$aU_n$" appears at the slider of this potentiometer. Further, each point $A_n$ is connected to the end terminal of a potentiometer $b_n$, the slider of which is in turn connected to the $n$th stud of multiple switch $S_4$, so that the potential "$b_nU_n$" appear at the common pole of switch $S_4$. The potential difference $b_nU_n - aU_n$ is then applied to the first primary winding of the measuring transformer $T_r$. To a second primary winding of transformer $T_r$ is applied the potential difference $P_n$; at the output terminals of the transformer appear then the error potentials $Q_n$. These error signals $Q_n$ from the various points in the network are simultaneously displayed in a suitable way, e. g. a set of $n$ vibration galvanometers could be provided. A preferred way of simultaneous display of the error signals is to feed the error signal $Q_n$ through a phase-sensitive amplifier to the $y$-plates of a cathode ray oscilloscope with long-persistence screen, while the position of the respective $Q_n$ value displayed is moved synchronously with the action of the switches $S_1 \ldots S_4$, which are ganged together, so that there exists a definite spatial relation between the position of the signal $Q_n$ on the c. r. o. screen and the position ($A_n$, $B_n$, $C_n$) in the network. Of course, the impedances of potentiometers "$a$," "$b_n$" and primary windings of transformer $T_r$ have to be high with reference to the values of resistances $R_1 \ldots R_4$.

The circuit arrangement used in practice will now be described.

For convenience, Equation 4 will be rewritten as $$k^2 E_3 - E_2 - E_1 = Q \quad (5)$$

where $$E_1 = -P_n, \quad E_2 = -b_n U_n, \quad E_3 = -U_n$$

and $$k^2 = a_0$$

Fig. 3 shows a block schematic diagram of the equipment. The voltages required are selected by a 25 way multiple pole switch. Voltages $E_1$ and $-E_2$ are fed into a first difference unit, which produces an output $$-\left(\frac{E_1 + E_2}{2}\right)$$

The voltage $-E_3$ is passed through a calibrated adjustable potentiometer having a ratio $k^2 \div 2$, and the resultant voltage $$-\frac{k^2 E_3}{2}$$

is fed with the voltage $$-\left(\frac{E_1 + E_2}{2}\right)$$

into a second difference unit which produces an output $$\frac{1}{4}(E_1 + E_2 - k^2 E_3) = -\frac{Q}{4}$$

This residual $$-\frac{Q}{4}$$

is amplified and displayed on a cathode ray tube with a long persistence screen and having an $x$ deflection controlled by the same switch which selects the mesh points.

It is convenient to excite the network with 50 c./s. A. C. The difference units can then be connected in cascade through coupling condensers thus avoiding complications due to changes in D. C. levels. By using a frequency of 50 c./s. switching noise can be suppressed and the signs of the residuals displayed with very little extra equipment.

A convenient ready-made multiple pole switch is a multipole rotary switch of the kind driven by a ratchet motor and having banks of 25 contacts, arranged in a semicircle. The wipers are double ended so that each position is traversed twice in each rotation of the switch. By energising the motor coil with half wave rectified A. C. it is possible to rotate the wipers twice per second so that the switching rate is 50 positions per second. Under these conditions the time of transition between switch positions is quite short (about 1 millisecond). Spurious signals of quite large magnitude are developed due to changes of contact potential and (probably) thermal effects. Since these spurious signals are random they do not cancel, but contribute to the output $Q/4$ and would cause errors if not suppressed. Since they occur once each cycle and do not last more than 5 milliseconds they can be suppressed by blacking out the cathode ray tube trace for the half cycle during which they occur. By adjusting the relative phases of the voltages feeding the uniselector and the network, the blackout pulses can be arranged to suppress the signal just as it passes through zero.

In the absence of suppression and spurious signals the display would consist of a series of vertical lines of various length extending symmetrically on either side of the mean level. The suppressor pulse removes either the upper or lower half of each line depending on the phase of the signal, i. e. on the sign of the residual error Q; thus the display gives direct information about both sign and magnitude of the residual errors. Difference unit 1 (Fig. 3) is shown in detail in Fig. 4. If $r_{a1}$, $r_{a2}$ $\mu 1$ and $\mu 2$ are the anode impedances and amplification factors of the two triodes, and $R_1 = R_2 = R_3 = R_4 = R < R_5 = R_6$, the valves $V_{1A}$ and $V_{1B}$ act as phase splitters having a gain of $$1 - \frac{2R + r_a}{(\mu + 2)R + r_a} = (1 - \Delta)$$

Thus the potential of the anode of $V_{1A} = -E_1(1 - \Delta_1)$ and that of the cathode of $V_{1B} = +E_2(1 - \Delta_2)$. Hence the potential of the midpoint of $R_5$ is $$\frac{E_2(1 - \Delta_2) - E_1(1 - \Delta_1)}{2}$$

The effect of the finite values of $R_5$ and $R_6$ is to introduce unbalance. The anode load of $V_{1A}$ is $R_1$ in parallel with $R_5$ in series with the output impedance of the cathode follower while the cathode load is shunted by $R_6$ in series with $R_3$ and the anode impedance of $V_{1B}$ connected as a cathode follower in parallel. This unbalance as well as the unbalance caused by differences in $r_a$ and $\mu$ may be taken up by adjustment of the slider of $R_5$ so that the output is then equal to $\frac{1}{2}(E_2 - E_1)(1 - \Delta_0)$ where $\Delta_0$ is of the order of $$\frac{2R + r_a}{(\mu + 2)R + r_a}$$

With the valves and loads in use the value of $\Delta_0 \approx .04$. The second difference unit is similar except that the second grid of $V_2$ is fed with a known fraction of the input $E_3$ through a potentiometer. Its calibration takes into account the factor $(1 - \Delta_0)$ above and makes the instrument direct reading.

The output of the second difference unit passes through an attenuator to the main amplifier. This consists of a low noise pentode directly coupled to a double triode balanced 'see-saw' circuit which feeds the Y plates of the C. R. T. Direct coupling is used. The cathode ray tube has a double screen coating which produces a bright blue trace with a long yellow afterglow lasting several seconds. The $x$ deflecting voltages are obtained directly from two banks of the uniselector connected across part of the H. T. supply. The unwanted half cycle is suppressed by applying a 50 c./s. square wave to the grid of the C. R. T. The voltage from the transformer feeding the uniselector is passed through a phase shifting network and amplified and clipped by a double triode valve, one half of which is used as a diode. A diode is used across the grid leak of the C. R. T. for D. C. restoration.

In certain applications, D. C. excitation of the resistance network is used. In this case the rotating switch acts as a "chopper," and the resistance capacity coupled voltage subtraction circuits and amplifiers can be used unchanged providing an appropriate time constant is used throughout the amplifier chain. The display on the cathode ray tube screen then consists of a number of bright dots, their relative position with reference to a horizontal line corresponding to zero error giving the value and sign of the error.

This equipment may be applied to any network problem, the solution of which is facilitated by the simultaneous display of the sum or difference of up to three voltages. Thus, in addition to "residuals," boundary values and gradients may be displayed if the type of problem requires this.

What we claim is:

1. Electrical analogue computing apparatus for solving differential mathematical equations representing physical problems, comprising a resistance network representing at least part of the equation in finite difference form and having a series of nodal junction points, successive points representing successive position points of the finite difference equation, means for applying currents to the said nodal junction points and means for comparing the resulting potentials at the nodal junction points with required potential values satisfying the problem to be solved so as to derive error signals from the respective nodal junction points, and means for simultaneously displaying the error signals so derived from a number of nodal junction points so as to determine the effect of input adjustments on the voltage relationships at individual nodal junction points.

2. Electrical analogue computing apparatus for solving differential mathematical equations representing physical problems, comprising a resistance network representing at least part of the equation in finite difference form and having a series of nodal junction points, successive points representing successive position points of the finite difference equation, means for applying currents to the said nodal junction points and means for comparing the resulting potentials at the nodal junction points with required potential values satisfying the problem to be solved so as to derive error signals from the respective nodal junction points, cathode ray tube display apparatus including a tube the screen whereof has a long after glow, and multi-pole rotary switching apparatus for connecting the nodal junction points successively with the comparison and display apparatus to display all the error signals simultaneously.

3. Electrical analogue computing apparatus for solving differential mathematical equations representing physical problems respecting bodies which are long relative to their transverse dimensions such as shafts, comprising a resistance network representing at least part of the equation in finite difference form and including a pair of resistor strips having corresponding nodal junction points which represent position points along the body, resistors interconnecting said nodal junction points and representing the mechanical properties of said body, means for feeding currents to the nodal junction points in the first strip, means for deriving error signals from the corresponding nodal junction points in the second strip, and means for simultaneously displaying the error signals so derived from a number of nodal junction points so as to determine the effect of input adjustments on the voltage relationships at individual nodal junction points.

4. Electrical analogue computing apparatus for solving differential mathematical equations representing physical problems respecting bodies which are long relative to their transverse dimensions such as shafts, comprising a resistance network representing at least part of the equation in finite difference form and including a pair of resistor strips having corresponding nodal junction points which represent position points along the body, resistors interconnecting said nodal junction points and representing the mechanical properties of said body, means for feeding currents to the junction points in the first strip, a first subtracting circuit which derives the relationship $$-\frac{(E_1+E_2)}{2}$$

a second subtracting circuit in cascade with said first circuit, which second circuit derives the relationship $$\tfrac{1}{4}(E_1+E_2-kE_3)$$

where $E_1$ is a voltage representing the current fed to a nodal junction point in the first strip, $E_2$ the resulting voltage at said nodal junction point, and $E_3$ the resulting voltage at the corresponding nodal junction point in the second strip, and means for simultaneously displaying the signals derived from the second subtracting circuit for a number of nodal junction points so as to determine the effect of input adjustments on the voltage relationships at individual nodal junction points.

5. Electrical analogue computing apparatus for solving differential mathematical equations representing physical problems, comprising a resistance network representing at least part of the equation in finite difference form and having a series of nodal junction points, successive points representing successive position points of the finite difference equation, means for applying currents to the said nodal junction points and means for comparing the resulting potentials at the junction points with required potential values satisfying the problem to be solved so as to derive error signals from the respective nodal junction points, cathode ray tube display apparatus including a tube having a screen which has a long after glow, multipole rotary switching apparatus for connecting the nodal junction points successively with the comparison and display apparatus for display of all the error signals simultaneously, and means controlled by the rotary switching apparatus to co-relate the lateral displacement of the electron beam of the cathode ray tube simultaneously with the error signal corresponding to a particular nodal junction point to produce on the screen a display which consists of a series of separate lines located on each side of a datum line corresponding to zero error.

References Cited in the file of this patent

UNITED STATES PATENTS

| | | |
|---|---|---|
| 2,439,891 | Hornfeck | Apr. 20, 1948 |
| 2,501,058 | Klasek | Mar. 21, 1950 |
| 2,569,646 | Wade et al. | Oct. 2, 1951 |
| 2,734,682 | Mayes | Feb. 14, 1956 |

OTHER REFERENCES

The solution of Waveguide and Cavity-Resonator Problems with the Resistance-Network Analogue (Liebmann), Proceedings of IEE (London), vol. 09, pp. 260–272, May 1952.